June 18, 1929.   F. FREDSON   1,717,703
HARROW
Filed Jan. 23, 1928   2 Sheets-Sheet 1

Fred Fredson INVENTOR
BY Victor J. Evans
ATTORNEY

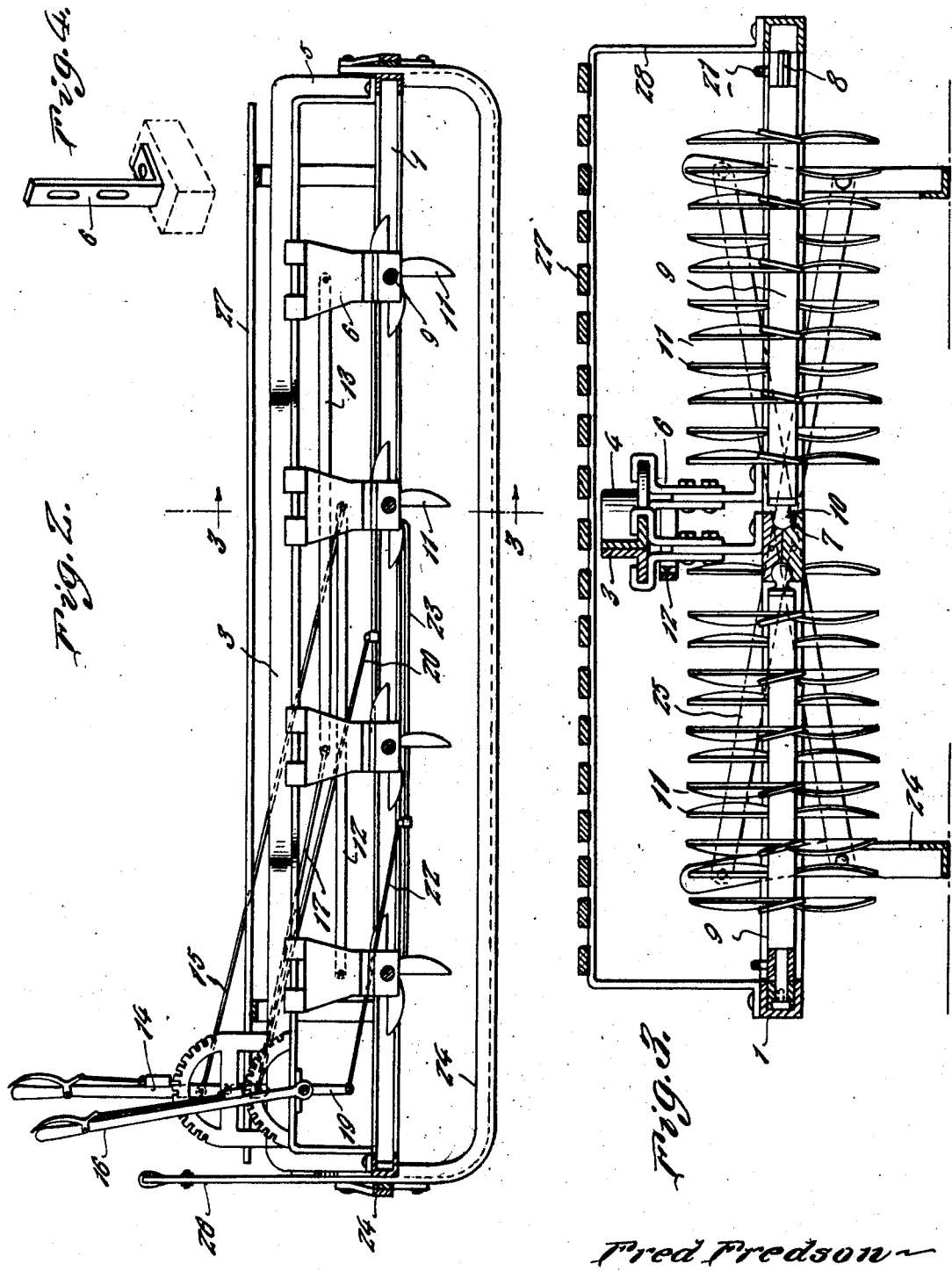

Patented June 18, 1929.

1,717,703

UNITED STATES PATENT OFFICE.

FRED FREDSON, OF LEONETH, MINNESOTA.

HARROW.

Application filed January 23, 1928. Serial No. 248,880.

This invention relates to a harrow, the general object of the invention being to provide a harrow which is provided with a plurality of shafts, each shaft carrying cutters which are each composed of four blades, each blade being arranged at an angle to the other blades so that they will finely pulverize the soil as the harrow is drawn across a field.

Another object of the invention is to provide means for adjusting the shafts so that they may be placed at right-angles to the longitudinal center of the harrow or at an incline to the said center by adjusting one end of each shaft forwardly and the other end rearwardly so as to increase the pulverizing action of the blades.

A still further object of the invention is to provide the harrow with collapsible runners so that its blades will be raised off the ground when the runners are in operative position, thus enabling the harrow to be transported without the blades engaging the ground.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 2 is a longitudinal sectional view.

Figure 3 is a section on line 3—3 of Figure 2.

Figure 4 is a detail view.

Figure 1:
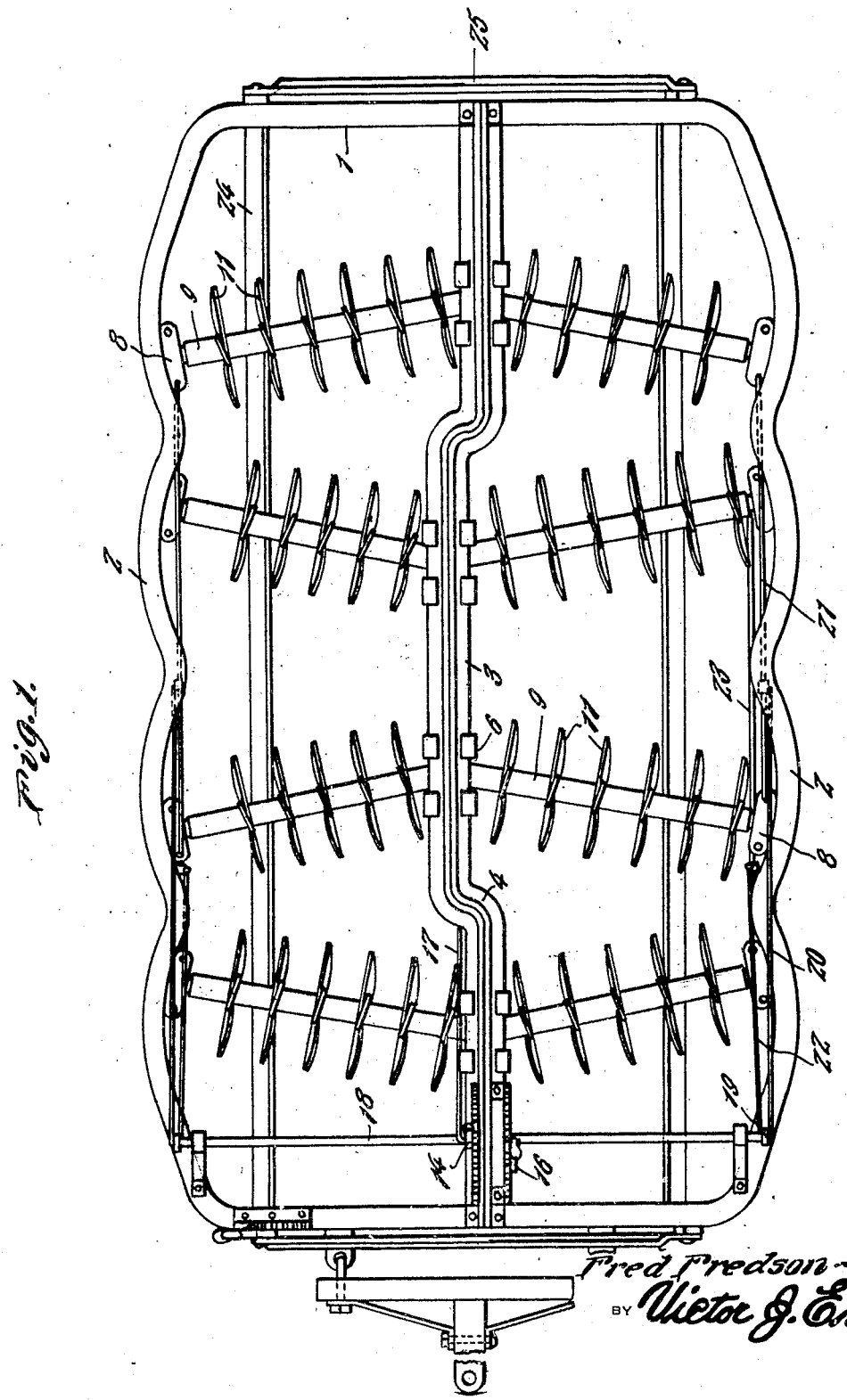
Figure 1 is a plan view of the improved harrow.

In these views, 1 indicates the frame of the harrow which has its side pieces formed of a plurality of arc-shaped parts 2 and its central bars 3 have their centers offset from their ends by the curved parts 4. These bars 3 are arranged above the plane of the end pieces 1 and side pieces 2 by having their ends bent downwardly, as at 5, and fastened to the end pieces. A number of hangers 6 is carried by the bars 3, the drawings showing two of the hangers on the central offset portion and a hanger on each end portion. These hangers are slidably connected with the bars 3, as shown. Each hanger has a spherical socket 7 at each side thereof.

A plurality of bearing members 8 is slidably arranged in the grooves of the side pieces 2 which are of channel shape in cross section to provide these grooves and a shaft 9 has its outer end journaled in each block 8 and its inner end in each socket 7, the inner end of each shaft being of ball shape, as shown at 10, to engage the socket. These shafts have loosely mounted thereon the cutters 11, each of which is formed with four blades, the blades being arranged at different angles, as fully shown in the drawings.

The first and third hangers 6 are connected together by the link 12 and the second and fourth hangers are connected together by the link 13. A hand lever 14 is arranged at the front of the device and it is connected by a rod 15 with the third hanger and a second hand lever 16 is connected by a rod 17 with the second hanger. Thus by pushing forwardly the lever 14, the first and third hangers will be moved forwardly so as to advance the inner ends of the first and third pairs of shafts. If the other lever is moved forwardly, the second and fourth hangers are advanced to advance the inner ends of the second and fourth pairs of shafts. Of course, by moving the levers in an opposite direction, the hangers are moved rearwardly. The levers are fastened to the shafts 18, each of which is provided with a depending arm 19 at its outer end and each arm is connected by a link 20 with a rod 21 which connects the blocks 8 of the second and fourth shafts together and each arm is connected by a link 22 with a rod 23 which connects the first and third blocks 8 together. Thus by manipulating the levers 14 and 16, the shafts can be adjusted to a position where they will be at rightangles to the length of the frame or they may be arranged in inclined positions to the axis of the machine, with the pairs of shafts at each side of the frame diverging toward the center, as shown in Figure 1. The peculiar formation of the center bars 3 and the side bars 2 permit this adjustment of the shafts.

A pair of runners 24 have their upwardly extending ends pivoted to the end pieces of the frames and the rear ends of the runners are connected together by the links 25 which are arranged in the form of an X. The front ends of the runners are similarly connected together. A hand lever 26 is arranged at the front of the frame and is connected with one of the runners so that by manipulating this hand lever, the runners can be swung downwardly into operative position where they will rest upon the ground and thus support a harrow and its blades off the ground or by moving the lever in an opposite direction, the runners can be folded upwardly against the frame so that the blades will enter the soil.

A platform 27 is supported by the upright frames 28 above the plane of the center bars 3 so that weights can be placed on the platform or the operator can stand thereon.

From the foregoing, it will be seen that I have provided a harrow, the parts of which can be adjusted to place the blades in the best position to secure the most efficient results in pulverizing the soil, with means for enabling the harrow to be transported from place to place without the blades engaging the surface over which the harrow is passing.

It is thought from the foregoing description that the advantages and novel features of my invention will be readily apparent.

It is to be understood that I may make changes in the construction and in the combination and arrangement of the several parts, provided that such changes fall within the scope of the appended claim.

What I claim is:—

A harrow of the class described comprising a substantially rectangular frame having its side pieces each formed of a plurality of arc-shaped portions, said side pieces being of channel shape in cross section, a center bar having depending end portions connected with the end pieces of the rectangular frame, said center bar having its central portion offset from the other portion, a number of hangers carried by the central bar and slidably arranged thereon, bearing blocks slidably arranged in the side pieces of the rectangular frame, a plurality of shafts, transversely arranged, each shaft having its outer end journaled in a block and its inner end journaled in a hanger, manually operated means for adjusting the blocks and the hangers, and rotary cutters on the shafts.

In testimony whereof I affix my signature.

FRED FREDSON.